G. B. WALENTER.
VALVE.
APPLICATION FILED DEC. 2, 1918.
1,315,438.
Patented Sept. 9, 1919.
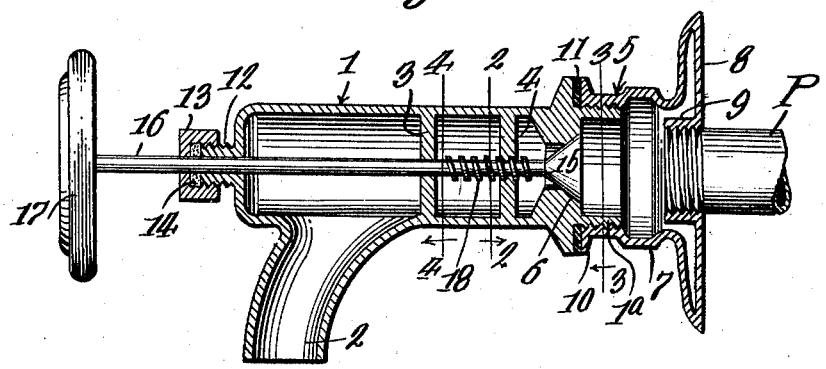
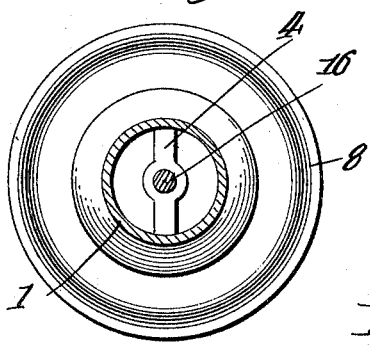
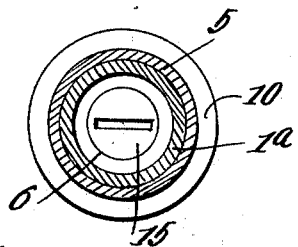
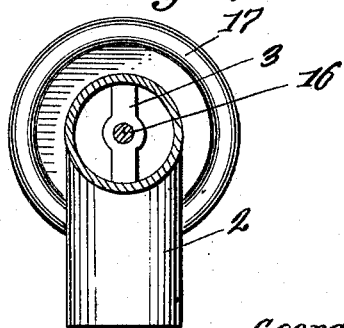
Witnesses
Guy M. Spring
S. M. McColl
Inventor
George B. Walenter
By Richard B. Owen,
Attorney

UNITED STATES PATENT OFFICE.

GEORGE B. WALENTER, OF NORTH CHICAGO, ILLINOIS.

VALVE.

1,315,438.     Specification of Letters Patent.     Patented Sept. 9, 1919.

Application filed December 2, 1918. Serial No. 265,025.

*To all whom it may concern:*

Be it known that I, GEORGE B. WALENTER, a citizen of the United States, residing at North Chicago, in the county of Lake and State of Illinois, have invented certain new and useful Improvements in Valves, of which the following is a specification.

This invention relates to valves for faucets, bibs, cocks and the like.

The object of the invention is to provide a simple and efficient valve constructed to resist wear, a minimum amount of rubber being used and against which there is practically no friction, and consequently no wear.

Another object is to provide a sectional faucet equipped with a valve constructed in accordance with this invention, the parts of which may be readily connected and disassembled for cleaning and other purposes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section of a faucet equipped with this improved valve, Fig. 2 is a transverse section taken on the line 2—2 of Fig. 1 looking in the direction of the arrow, Fig. 3 is a similar view taken on the line 3—3 of Fig. 1 looking in the direction of the arrow, and Fig. 4 is a similar view taken on the line 4—4 of Fig. 1.

In the embodiment illustrated, the valve constituting this invention is shown applied to a faucet comprising a shell or casing 1 having a water outlet spout 2 and longitudinally spaced valve stem guides 3 and 4. A connecting section 5 which unites the shell 1 to the water supply pipe P has threaded engagement with the neck 1ª of the shell 1 with a bulge 7 shown intermediately thereof and an annular flange 8 at its base or bearing portion which fits flat against the wall through which the pipe P enters. An inwardly extending internally threaded collar or sleeve 9 receives pipe P as is shown clearly in Fig. 1 and the front end of the member 5 has an annular flange 10 between which and the inner end of shell 1 is placed a gasket 11 to insure a watertight connection between the two members of the faucet. The inner end of the shell 1 has a valve seat 6, here shown integral with said shell and with which a cone-shaped valve 15, is designed to coöperate.

The outer end of the shell 1 has an externally threaded tubular nipple or neck 12 on which fits a cap-like member or nut 13 with a gasket 14 arranged between it and said nipple 12, said cap and gasket being apertured for the passage of the valve stem 16. This valve stem 16 is provided at its outer end with an actuating knob 17 which may have printed or embossed thereon any suitable inscription, such as hot, cold, or the like, although it need not have any if desired. The inner end of stem 16 is threaded as shown at 18 and has threaded engagement with the guide 4 so that on the turning of the knob 17 the valve 15 will be opened or closed according to the direction in which said knob is turned.

From the above description it will be seen that the only rubber employed in connection with this device are the gaskets 11 and 14 there being none about the valve or its seat and thus insuring long life to the various parts.

While the valve is shown applied to a faucet, it is of course to be understood that it may be used in many other connections.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

A faucet of the class described comprising two sections, one having a threaded extension with an exterior annular flange at its inner end to form an abutment, the other having an outwardly extending lateral flange at its outer end and threaded onto said section, and having a hollow annular flange at its inner end, the inner wall of the latter being flat and having an internally threaded collar extending inwardly, and a valve in the first mentioned section.

In testimony whereof I affix my signature in presence of two witnesses.

GEORGE B. WALENTER.

Witnesses:
JOHN PESKATOR,
LEWIS A. WELSCH.

Copies of this patent may be obtained for five cents each, by addressing the "Commissioner of Patents, Washington, D. C."